(12) United States Patent
Hadizad et al.

(10) Patent No.: US 9,071,347 B2
(45) Date of Patent: Jun. 30, 2015

(54) ELECTRONIC DEVICE AND METHOD FOR TRANSFERRING INFORMATION FROM ONE DEVICE TO ANOTHER DEVICE

(75) Inventors: Peyman Hadizad, Redwood City, CA (US); Roupen Nahabedian, Redwood City, CA (US); Scott R. Schroeder, Pleasanton, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 170 days.

(21) Appl. No.: 13/590,209

(22) Filed: Aug. 21, 2012

(65) Prior Publication Data

US 2014/0057557 A1    Feb. 27, 2014

(51) Int. Cl.
G06F 15/16 (2006.01)
H04B 17/00 (2015.01)
H04W 8/22 (2009.01)
H04W 4/00 (2009.01)

(52) U.S. Cl.
CPC ............... *H04B 17/00* (2013.01); *H04W 8/22* (2013.01); *H04W 4/001* (2013.01); *H04W 4/008* (2013.01)

(58) Field of Classification Search
USPC .............. 455/41.1, 67.11; 709/217, 228; 717/174–178
See application file for complete search history.

(56) References Cited

U.S. PATENT DOCUMENTS

| | | | |
|---|---|---|---|
| 7,881,315 B2 | 2/2011 | Haveson et al. | |
| 8,490,084 B1 * | 7/2013 | Alford et al. | 717/177 |
| 2005/0021953 A1 * | 1/2005 | Trommler | 713/166 |
| 2006/0265708 A1 * | 11/2006 | Blanding et al. | 717/174 |
| 2011/0047594 A1 | 2/2011 | Mahaffey et al. | |
| 2011/0047597 A1 | 2/2011 | Mahaffey et al. | |
| 2013/0185380 A1 * | 7/2013 | Anderson et al. | 709/217 |
| 2013/0318249 A1 * | 11/2013 | McDonough et al. | 709/228 |

* cited by examiner

*Primary Examiner* — Junpeng Chen
(74) *Attorney, Agent, or Firm* — Morris & Kamlay LLP

(57) ABSTRACT

An electronic device configured for transferring at least one on board application program to a second electronic device, includes a processor employing software for performing an analysis of real-time operating characteristics of the electronic device, including any anomalous operating characteristics, in relation to on board application programs in the electronic device. A communication link, coupled to the electronic device, is configured for transferring at least one onboard application program from the electronic device to the second electronic device. The transfer of the at least one onboard application program from the electronic device to the second electronic device proceeds only if the software employed by the processor validates that the at least one onboard application program in the electronic device is unlikely to degrade operating characteristics of the second electronic device.

17 Claims, 5 Drawing Sheets

ELECTRONIC DEVICE AND METHOD FOR TRANSFERRING INFORMATION FROM ONE DEVICE TO ANOTHER DEVICE

TECHNICAL FIELD

One or more disclosed embodiments relate to a system and method for conditional transferring or copying of application programs from one device to another device.

BACKGROUND

Mobile devices are used throughout the world for communication purposes. For example, people are able to text and talk to each other, surf the web and access information on their mobile phones. In fact, the rate of growth of mobile phones is outpacing the rate of growth of conventional personal computers. Since mobile devices have gained such widespread use, there is an ever increasing need for these devices to utilize digital content. Digital content includes application programs, pictures, music, documents and video, etc. Mobile devices and other computing devices are being increasingly used to share application programs, as well as the data associated with application programs and digital content in general.

BRIEF DESCRIPTION OF DRAWINGS

These and other advantages of one or more embodiments of the invention will become more apparent as the following description is read in conjunction with the accompanying drawings, wherein.

Figure 1:
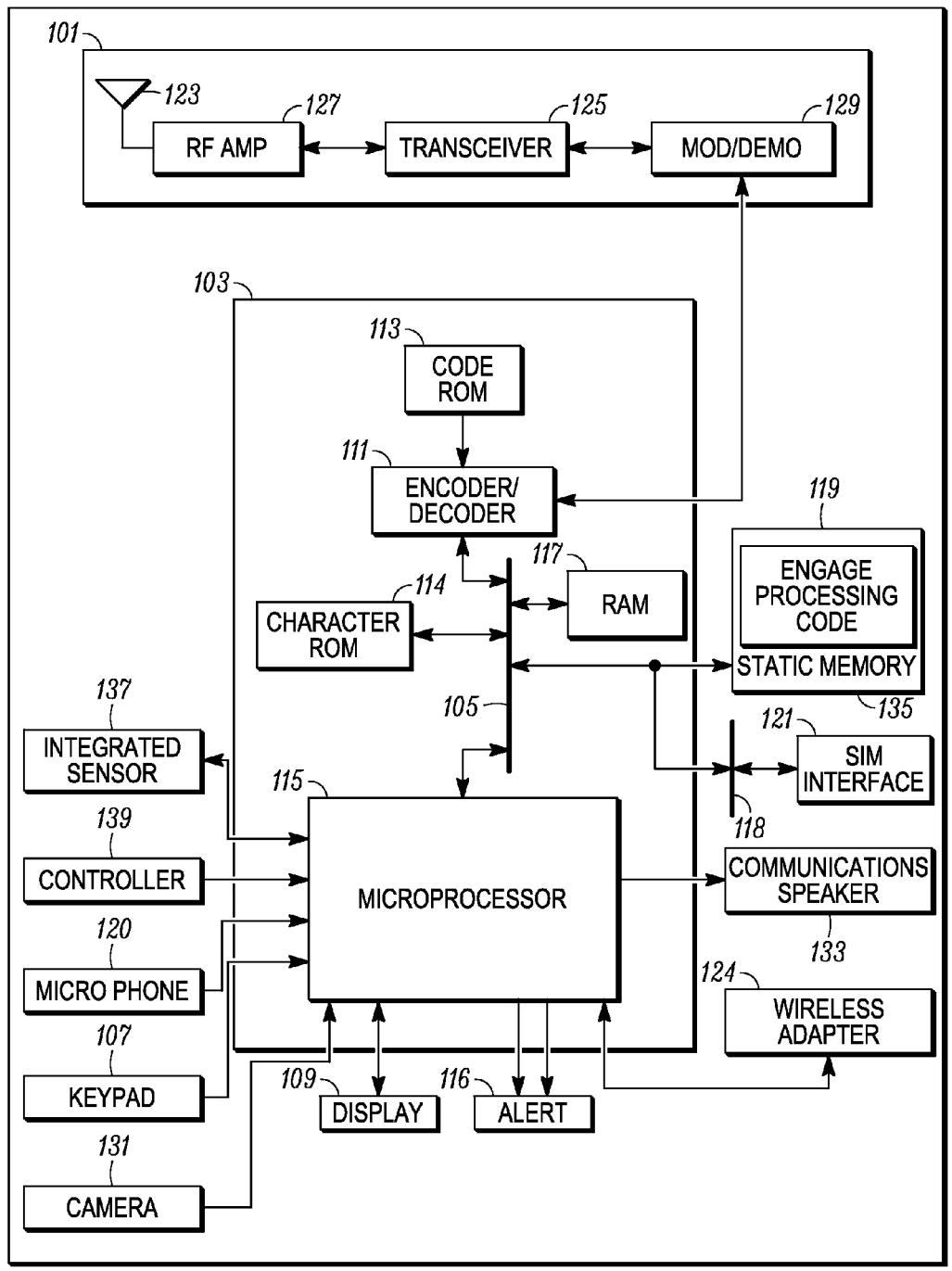
FIG. 1 is an example of a schematic diagram of a mobile device.

Skilled artisans will appreciate that the elements in the figures are illustrated for simplicity and clarity and have not necessarily been drawn to scale. For example, the dimensions of some of the elements in the figures may be exaggerated relative to other elements to help improve the understanding of one or more disclosed embodiments.

The apparatus and method components have been represented by conventional symbols in the drawings, showing only those specific details that are pertinent to understanding one or more embodiments, so as not to obscure the disclosure with details that will be readily apparent to those of ordinary skill in the art having the benefit of the description herein.

DETAILED DESCRIPTION

One or more disclosed embodiments are described with reference to the drawings, where like components are identified with the same numerals. The descriptions of the preferred embodiments are exemplary and are not intended to limit the scope of the disclosure described herein.

In at least one embodiment, an electronic device is configured for transferring at least one on board application program to a second electronic device. The electronic device can include a processor employing software for performing an analysis of real-time operating characteristics of the electronic device, including any anomalous operating characteristics, in relation to on board application programs in the electronic device; and a communication link that is coupled to the electronic device and is configured for transferring at least one onboard application program from the electronic device to the second electronic device. The transfer of the at least one onboard application program from the electronic device to the second electronic device proceeds only if the software employed by the processor validates that the at least one onboard application program in the electronic device is unlikely to degrade operating characteristics of the second electronic device.

FIG. 1 is an example schematic diagram of a mobile device. In one embodiment, mobile device 100 may be a laptop or notebook computer, a tablet computer, an Ultrabook computer, a wearable computing device, a cell phone or a smartphone, or any other similar computing device. Mobile device 100 includes a communication unit 101 and a processor 103. Communications unit 101 is a combined receiver and transmitter having an antenna 123 for receiving radio frequencies. The communications unit 101 has a transceiver 125 coupled to the antenna 123 via a radio frequency amplifier 127. The transceiver 125 is also coupled to a combined modulator/demodulator 129 that is coupled to an encoder/decoder 111 of processor 103.

Processor 103 includes an encoder/decoder 111 with an associated code Read Only Memory (ROM) 113 for storing data for encoding and decoding voice or other signals that may be transmitted or received by the mobile device 100. The processor 103 further includes a microprocessor 115 coupled, by the command data and address bus 105, to the encoder/decoder 111, a character ROM 114, a Random Access Memory (RAM) 117, programmable memory 119 and a Subscriber Identity Module (SIM) interface 121. The programmable memory 119 and a static memory are operatively coupled to the SIM interface 121. Each can store, among other things, selected text messages and a Telephone Number Database (TND) comprising a number field for telephone numbers and a name field for identifiers associated with one of the numbers in the name field.

The mobile device 100 may also include a keypad 107 (although it need not require a keypad), a display screen 109, such as a touch screen user interface, coupled to be in communication with the processor 103. Microprocessor 115 has ports for coupling to the keypad 107, to the display screen 109, and to a camera 131. The microprocessor 115 further has ports for coupling to an alert module 116 that typically contains an alert speaker, vibrator motor and associated drivers; to a wireless peripheral adapter 124 such as Bluetooth® adapter; to a microphone 120; to a set of integrated sensors 137; to a controller 139; and to a communications speaker 133. Some examples of integrated sensors 137 can include accelerometers, proximity sensors or Coulomb counters.

An accelerometer is an electromechanical device capable of measuring acceleration forces. The acceleration forces can be static or dynamic. Some accelerometers use a piezoelectric effect to measure changes in voltage due to stress on microscopic crystal structures. Other accelerometers may sense changes in capacitance of two microstructures as they move relative to each other. Other methods for implementing an accelerometer are contemplated as well, including the use of a piezoresistive effect and light, for example.

Proximity sensors detect the presence of objects without requiring physical contact. There are several types of proximity sensors available for use by those skilled in the art of integrated sensor technology, including inductive, capacitive, photoelectric, and magnetic, for example. An inductive proximity sensor detects metallic objects. A capacitive proximity sensor can detect metallic and non-metallic objects. A photoelectric proximity sensor is configured to use light sensitive elements to detect objects. A magnetic proximity sensor detects the presence of permanent magnets.

A Coulomb counter is an intelligent sensor which is interfaced to the microprocessor 115 of mobile device 100. The Coulomb counter is one example of different types of integrated sensors that can be used to obtain some of the data on the key performance attributes or characteristics of the mobile device 100. For example, Coulomb counter 137 can measure the static and dynamic charge state of a battery of mobile device 100, with the measured data used to obtain information on the power consumption of the mobile device 100. Other firmware, hardware or software components can also be used to determine performance attributes of the mobile device.

Wireless peripheral adapter 124 may be a local access network (LAN), wireless access network, wide area network (WAN), a virtual area network, a wireless fidelity (Wi-Fi) network, a Bluetooth link, an Ethernet link, a satellite link, a cable link, a cellular, fiber-optic or near-field communication (NFC) link, or any network that can facilitate the transfer of data intensive information between mobile phones or similar computing devices, including wearable computers and gaming devices, for example.

Character ROM 114 stores code for decoding or encoding data, such as text messages that may be received by the communications unit 101. In some embodiments described herein, the character ROM 114, the programmable memory 119, or a SIM module can also store operating code (OC) for the microprocessor 113 and code for performing functions associated with the mobile device 100. For example, the programmable memory 119 can comprise computer readable program code components 135 configured to cause execution of a method for performing diagnostic analysis of the device and transferring one or more software application programs between devices, according to at least one disclosed embodiment.

Figure 2:
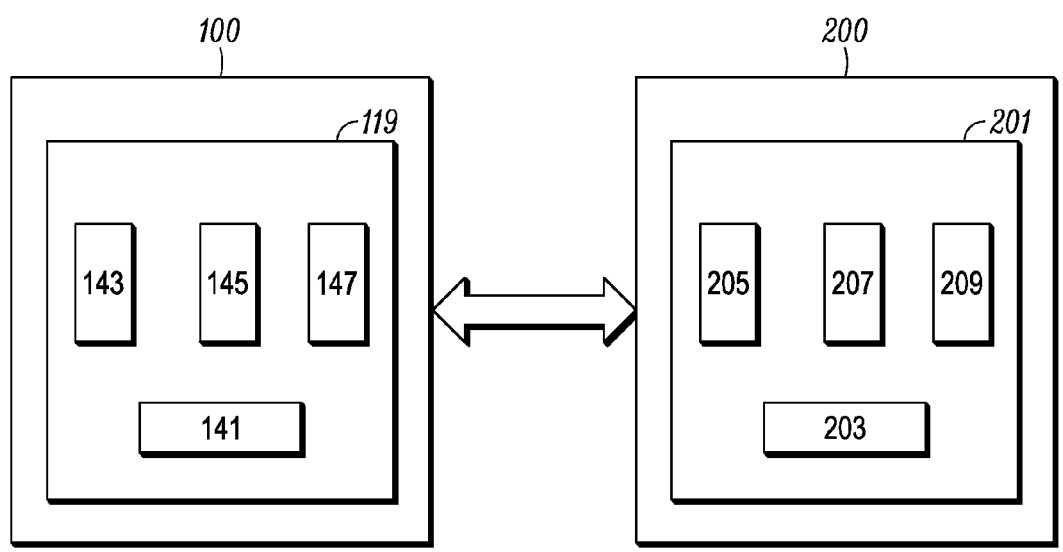
FIG. 2 is an illustration of a first mobile device and a second mobile device.

FIG. 2 shows a mobile device 100 that includes a programmable memory 119 that stores a Special Application Software (SAS) 141, an application program 143, an application program 145 and an application program 147. Mobile device 200 (also shown in FIG. 2) includes a programmable memory 201 that stores an SAS 203, an application program 205, an application program 207 and an application program 209. Application programs 143, 145, 147, 203, 205 and 207 may be typical software programs that are a set of programs, procedures, algorithms and documentation which are integral to the operation of a data processing system for performing functions or controlling features of mobile device 100 and 200, respectively. Mobile devices 100 and 200 are configured to be communicatively coupled or linked for transfer of any one of the application programs 143, 145, 147, 203, 205 and 207.

Figure 3:
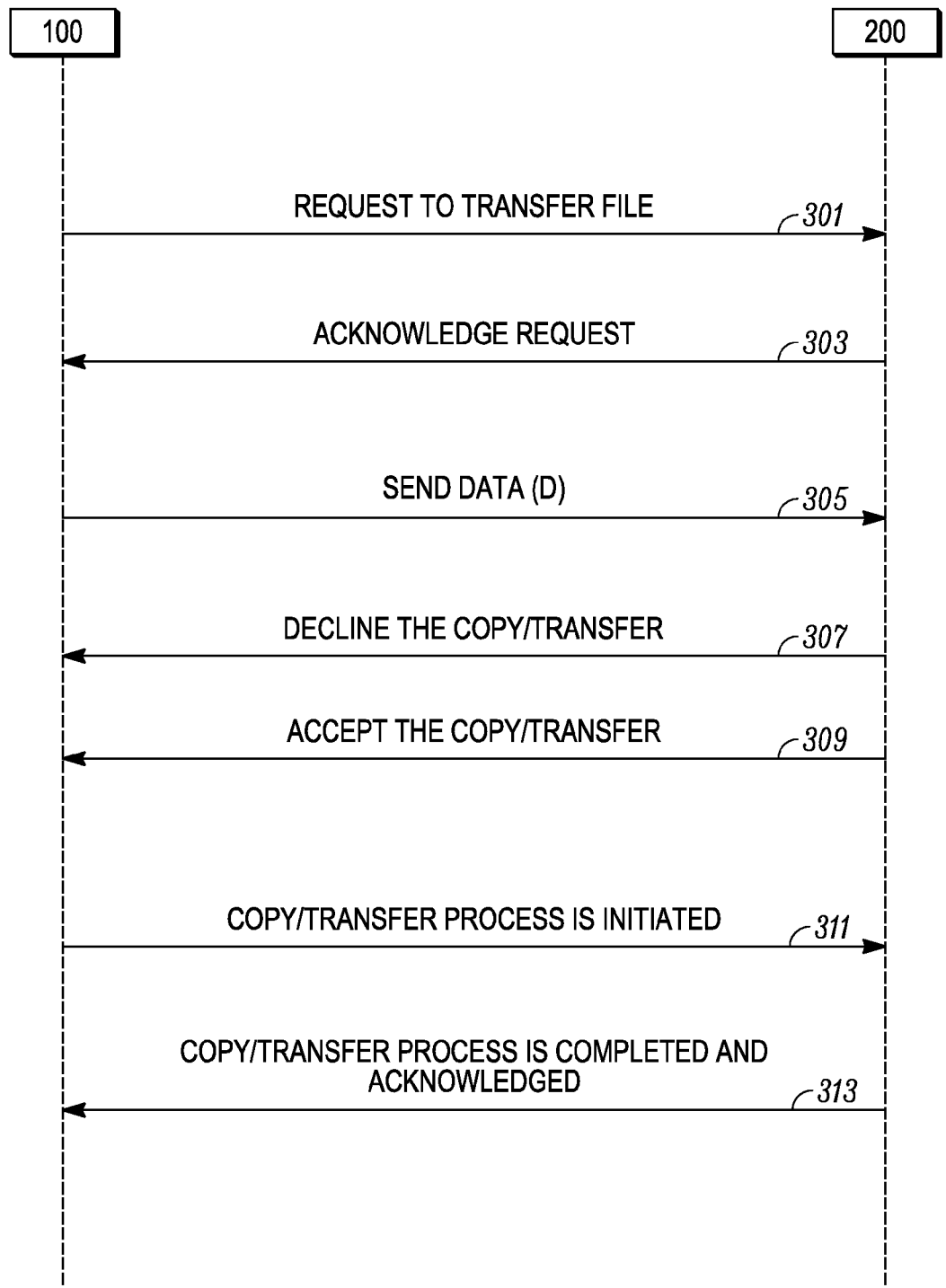
FIG. 3 is a high-level timing diagram illustrating the sequence of events between the first and second mobile devices of FIG. 2.

FIG. 3 is a high-level timing diagram illustrating the sequence of events between a first mobile device 100 and a second mobile device 200. Mobile device 200 is equivalent to mobile device 100 described above, so a recitation of all the components will not be provided herein. In another embodiment, mobile device 200 may be a gaming device, a wearable computer, a laptop or notebook computer, an Ultrabook computer, a tablet computer, a cell phone or a smartphone, a wearable computing device, or any other similar computing device.

Special Application Software (SAS) 141 in mobile device 100 extracts and analyzes real-time data associated with key, predefined device performance attributes and/or operating characteristics (used interchangeably, herein) at frequent time intervals. The said real-time data is analyzed in relation to the operational state of application programs 143, 145 and 147, which reside in mobile device 100. The real-time data may in part include the following, for example, power consumption of the mobile device 100; utilization of the resources of processor 103 or microprocessor 115; output data generated by various integrated sensors 137; delay times associated with activating and de-activating of application programs 143, 145 and 147 based on the number and types of active application programs at the onset of such actions; data processing rates associated with transmitting or receiving data, certain unexpected conditions, such as environmental conditions, like temperature, occurring among various components of the mobile device 100 or transitions of the mobile device's 100 components to undefined or unknown states, as well as any anomalous events associated with the disruption or degradation of the normal operating characteristics of mobile device 100 in general. SAS 141 in mobile device 100 analyzes the real-time data described above and stores this data (D).

In general, normal operating characteristics of the mobile device 100 are measurable characteristics which are obtained upon implementation of a defined set of input conditions and processes, with the set of input and output conditions/processes in turn defined based on design specifications for the hardware, firmware or software components of mobile device 100. Application programs 143, 145 and 147 may be typical software programs that are a set of programs, procedures, algorithms and documentation which are integral to the operation of a data processing system.

With reference to FIG. 3, mobile devices 100 and 200 establish a near-field communication link (NFC) or establish other equivalent close proximity communication links. The establishment of a communication link, such as NFC, can occur when mobile device 100 and mobile device 200 are in physical contact with or in close proximity to each other. Alternatively when mobile device 100 and mobile device 200 are not in close proximity to each other another type of communication link may be established. Several operations that transpire between mobile device 100 and mobile device 200 are illustrated in FIG. 3. Operation 301 enables the mobile device 100 to receive an input (i.e., a request) via a keyboard input, a voice command, or a user interface, for example, to copy or transfer one or more application programs 143, 145 and 147 from mobile device 100 to mobile device 200.

Alternatively, in another embodiment, mobile device 200 may receive a request via a keyboard input, a voice command, or a gesture corresponding to the user interface, for example, to copy or transfer one or more of application programs 205, 207 and 209 from mobile device 200 to mobile device 100. Hence, the request may be manipulated by manual input, including touchscreen input, gesturing, or swiping of icons, for example. Application programs 205, 207 and 209 may be typical software programs that are a set of programs, procedures, algorithms and documentation which are integral to the operation of a data processing system.

In one embodiment, mobile device 200 receives the request from mobile device 100, and operation 303 enables mobile device 200 to provide an acknowledgement or notification, thereby acknowledging the request by the user of mobile device 100 to copy or transfer data. The intended copying or transferring process described herein can employ Digital Rights Management (DRM) rules, and can be subject to the authorized mobile device 200 receiving user input to that device to acknowledge and accept the copying or transferring request. In some cases, the authorized user of mobile device 100 and mobile device 200 may be the same person. At operation 305, a controller or processor in mobile device 100 employing instructions in a Special Software Application transmits data (D) as described above (e.g., real-time) and corresponding to mobile device 100 to or shares with mobile device 200. Additional conditions on the transmission of (D) include the following: send (D) only if the events leading to the creation of data (D) took place in mobile device 100, and only after mobile device 100 has received initial request for copying or transferring one or more of application programs 143, 145 and 147 from mobile device 100 to mobile device 200 and mobile device 200 has provided an acknowledgement and acceptance of the request.

SAS 203 in device 200, which is equivalent to SAS 141 in device 100, analyzes the received real-time data (D) in relation to the set of application programs 205, 207 and 209 which reside in mobile device 200. SAS 203 in mobile device 200 performs this analysis in order to determine if the copying or transferring of the intended one or more of application programs 143, 145 and 147 from mobile device 100 to mobile device 200 will result in, in combination with the already existing application programs 205, 207 and 209, one or more subsets of application programs which would be identical to the subset of application programs which led to any anomalous events in mobile device 100. Operation 307 shows that in case SAS 203 in mobile device 200 determines that an adverse condition, previously created in mobile device 100, would be created in mobile device 200, it either prevents and/or declines the copying of the intended one or more application programs 143, 145 and 147 from taking place, or it triggers a notification to mobile device 100 and mobile device 200 indicating that the copying or transferring of the intended one or more application programs 143, 145 and 147 could potentially cause disruption or degradation of the normal operating characteristics of mobile device 200.

Alternatively, operation 309 shows that where SAS 203 in mobile device 200 determines that a condition previously created in mobile device 100 would not be recreated in mobile device 200, SAS 203 (as controlled by its relevant processor) enables and/or accepts the means for copying or transferring of the intended one or more of application programs 143, 145 and 147 from mobile device 100 to mobile device 200, or sends a notification to mobile device 200 instructing allowance of the copying process to continue. Operation 311 initiates the copying/transferring process upon the acceptance of the copying or transferring process by the special application software 203 in mobile device 200. Operation 313 controls the completion of the copying/transferring process.

Figure 4:
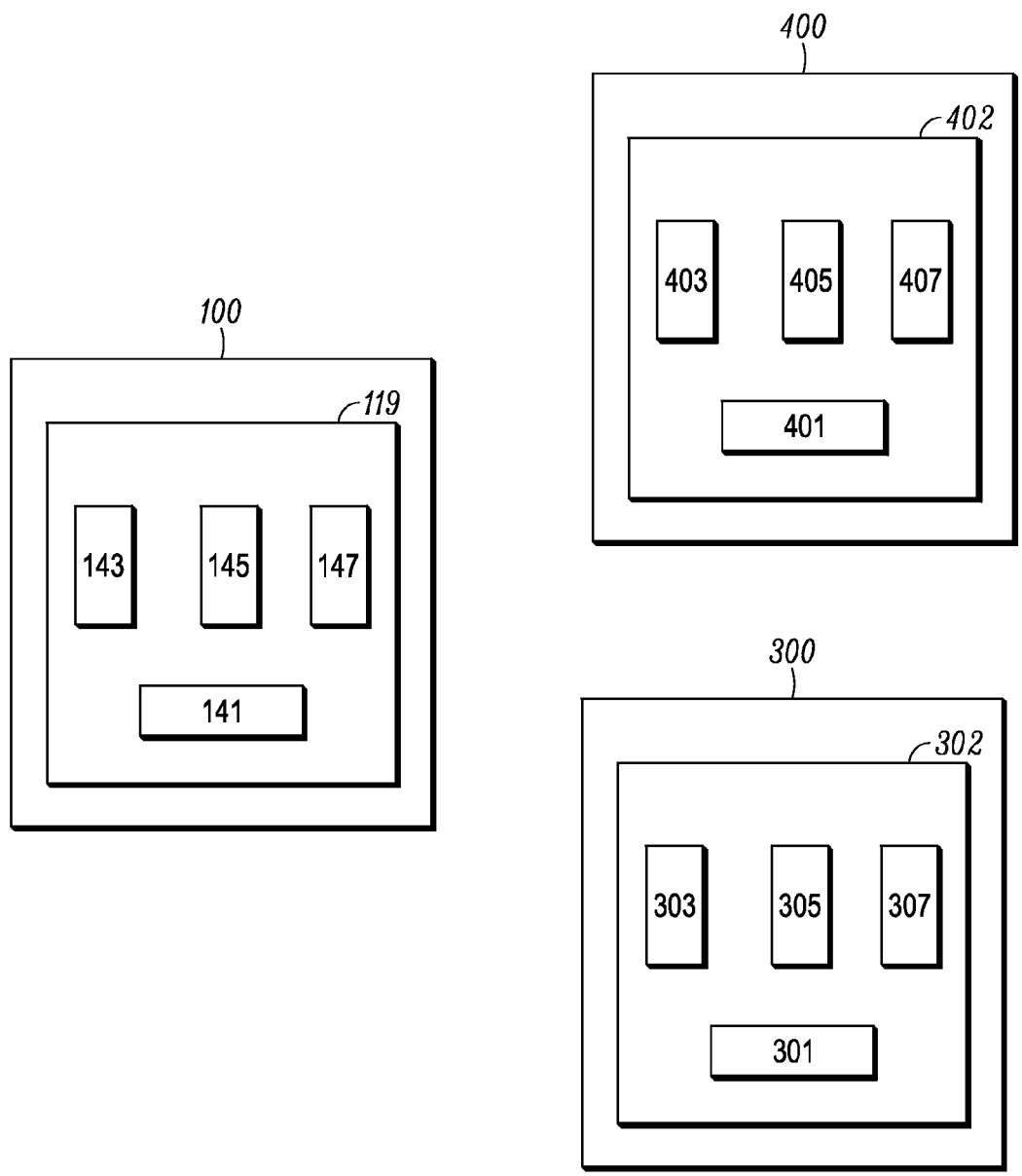
FIG. 4 is an illustration of the first mobile device of FIG. 1 and a plurality of other mobile devices.

FIG. 4 shows multiple mobile devices that are configured and operable to communicate with each other such that stored application programs may be copied or transferred from one mobile device to another. That is mobile device 100 may connect to multiple mobile devices; therefore, the number of other mobile devices that mobile device 100 may connect to is unlimited, albeit for simplicity and clarity a mere two additional mobile devices, mobile device 300 and mobile device 400, are shown herein in FIG. 4. Mobile device 300 includes a programmable memory 302 that stores SAS 301, application program 303, application program 305 and application program 307. SAS 301 in mobile device 300 can be equivalent to SAS 141 in mobile device 100. Likewise, application programs 303, 305, and 307 in mobile device 300 can be equivalent to the application programs 143, 145, and 147 in mobile device 100. Alternatively, one or more application programs in mobile device 300 may differ from one or more application programs in mobile device 100.

Likewise, mobile device 400, shown in FIG. 4, includes a programmable memory 402 that stores SAS 401, application program 403, application program 405 and application program 407. SAS 401 in mobile device 400 can be equivalent to SAS 141 in mobile device 100. Likewise, application programs 403, 405, and 407 in mobile device 400 can be equivalent to the application programs 143, 145, and 147 in mobile device 100. Alternatively, one or more application programs in mobile device 400 may differ from one or more application programs in mobile device 100.

Furthermore, programmable memory 302 and programmable memory 402 are equivalent to programmable memory 119 for mobile device 100 described above. Application programs 303, 305, 307, 403, 405 and 407 may be typical software programs that are a set of programs, procedures, algorithms and documentation which are integral to the operation of a data processing system.

Figure 5:
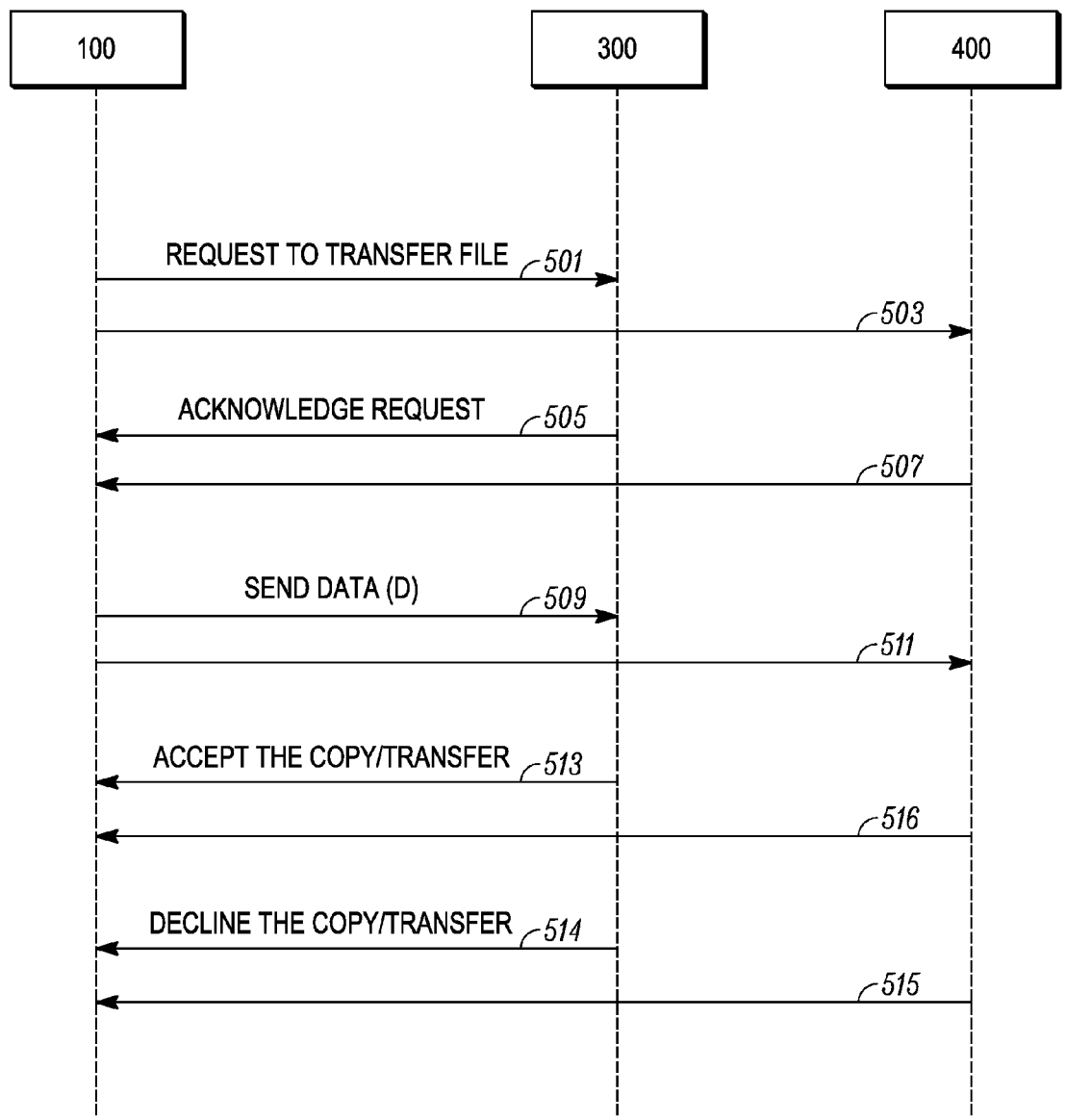
FIG. 5 is a high-level timing diagram illustrating the sequence of events between the first mobile device and the plurality of other mobile devices of FIG. 4.

FIG. 5 illustrates another example of a high-level timing diagram useful for describing several sequences of events that may occur between mobile device 100 and mobile device 300; and also between mobile device 100 and mobile device 400. Mobile device 300 and mobile device 400 are equivalent to mobile device 100 described above so a recitation of all the components will not be provided herein. Mobile device 300 and mobile device 400 may also be a laptop, an Ultrabook, a gaming device, a wearable computer, a notebook computer, a desktop computer, a tablet computer, a cell phone or smart phone or any other similar type of computing device, for example.

Mobile devices 100, 300 and 400 may touch or otherwise come within range of one another so that their respective communication components establish a near-field communication link or other equivalent communication link. Under such conditions, operations 501 and 503 performed by mobile device 100 enable mobile device 100 to receive an input (i.e., a request) via a user interface or other type of input means to copy or transfer one or more of application programs 143, 145 and 147 from mobile device 100 to either mobile device 300 or mobile device 400, or to both mobile devices 300 and 400, either concurrently or simultaneously. Alternatively, in another embodiment, the user of mobile device 300 or mobile device 400 may provide an input (a request) via a user interface means to copy or transfer one or more application programs from that device to either one or both of the other devices. The said application programs may be typical software programs that are a set of programs, procedures, algorithms and documentation which are integral to the operation of a data processing system.

In one embodiment, mobile device 100 requests to copy or transfer one or more application programs from that device to receiving mobile devices 300 and 400; therefore, mobile devices 300 and 400 receive the request from mobile device 100, after which the users of those devices, as provided for by operations 505 and 507, may acknowledge the request by a user of mobile device 100. The intended copying or transferring process described herein can be based on Digital Rights Management rules or its equivalent, and can be subject to the authorized users of mobile devices 300 or 400 providing an input to each respective device to acknowledge and accept the copying or transferring request. In another embodiment, the authorized users of mobile device 100 and mobile devices 300 and 400 may be the same person. At operations 509 and 511, analytic real-time data (D), as described above, is sent to or shared with mobile devices 300 and 400 from mobile device 100, only if the events leading to the creation of data (D) took place in mobile device 100, and only after the user of mobile device 100 has initiated the request for copying or transferring of one or more application programs 143, 145 and 147 from mobile device 100 to mobile devices 300 and 400 and the users of those device have acknowledged and accepted this request.

SAS 301 in mobile device 300 analyzes the received data (D) in relation to the set of application programs which reside in that device. SAS 301 performs this analysis in order to determine if the copying or transferring of the intended one or more of application programs 143, 145 and 147 from mobile device 100 to mobile device 300 will result in, in combination with the already existing application programs 303, 305 and 307, one or more subsets of application programs which would be identical to the subset of application programs which led to the anomalous events in mobile device 100 associated with data (D). In case SAS 301 in mobile device 300 determines that the adverse condition previously created in mobile device 100 would be created in mobile device 300, as shown in block 514, it either prevents the copying or transferring of the intended one or more application programs 143, 145 and 147 from taking place, or it triggers a notification mechanism to the users of mobile device 100 and mobile device 300 indicating that the copying or transferring of the intended one or more of application programs 143, 145 and 147 could potentially cause the disruption or degradation of the normal operating characteristics of mobile device 300.

Alternatively, when SAS 301 in mobile device 300 determines that the adverse condition previously created in mobile device 100 would not be created in mobile device 300, as shown in block 513, it enables the means for copying or transferring of the intended one or more application programs 143, 145 and 147 from mobile device 100 to mobile device 300. SAS 401 in mobile device 400 analyzes the received data (D) in relation to the set of application programs which reside in that device. SAS 401 performs an analysis which is similar to that performed by SAS 301 in order to determine if the copying or transferring of the intended one or more application programs 143, 145 and 147 from mobile device 100 to mobile device 400 will result in, in combination with the already existing application programs 403, 405 and 407, one or more subsets of application programs which would be identical to the subset of application programs which led to the anomalous events in mobile device 100 associated with data (D).

When SAS 401 in mobile device 400 determines that the adverse condition previously created in mobile device 100 would be created in mobile device 400, as shown in block 515, it either prevents the copying or transferring of the intended one or more application programs 143, 145 and 147 from taking place, or it triggers a notification mechanism to the users of mobile device 100 and mobile device 400 indicating that the copying or transferring of the intended one or more application programs 143, 145 and 147 could potentially cause the disruption or degradation of the normal operating characteristics of mobile device 400. Alternatively, in case SAS 401 in mobile device 400 determines that the adverse condition previously created in mobile device 100 would not be created in mobile device 400, as shown in block 516, it enables the means for copying of the intended one or more application programs 143, 145 and 147 from mobile device 100 to mobile device 400.

Although the present invention has been described above in terms of specific embodiments, many modifications and variations of this invention can be made as will be obvious to those of ordinary skill in the art, without departing from its spirit and scope as set forth in the following claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more, unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. [0035]

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electronic device configured for transferring at least one on board application program to a second device, the electronic device comprising:
   a processor employing software for performing an analysis of at least one operating characteristic of the electronic device in relation to at least one on board application program in the electronic device; and
   a communication link coupled to the electronic device configured for transferring at least one onboard application program from the electronic device to the second device,
   wherein the transfer of the at least one onboard application program from the electronic device to the second device proceeds only if the software employed by the processor determines that an identified anomalous operating characteristic of the electronic device would not occur in the second device if the at least one onboard application program is executed on the second device.

2. The electronic device as claimed in claim 1, further comprising a transceiver.

3. The electronic device as claimed in claim 1, wherein the communication link coupled to the electronic device is a near field communication link.

4. The electronic device as claimed in claim 1, wherein the electronic device is a mobile phone.

5. The electronic device as claimed in claim 1, wherein the electronic device is a tablet computer.

6. The electronic device as claimed in claim 1, further comprising a wireless adapter.

7. The electronic device as claimed in claim 1, wherein the electronic device is configured to receive notification that a transfer of at least one on board application program is possible without causing degradation of operating characteristics for the second device.

8. An electronic device configured for receiving at least one on board application program from a second device, the electronic device comprising:
   a processor employing software for performing an analysis of at least one operating characteristic of the second device in relation to at least one on board application program in the second device; and
   a communication link coupled to the electronic device configured for receiving at least one onboard application program from the second device,
   wherein the receiving the at least one onboard application program from the second device proceeds only if the software employed by the processor determines that an identified anomalous operating characteristic of the second device would not occur in the electronic device if the at least one onboard application program is executed on the electronic device.

9. The electronic device as claimed in claim 8, further comprising a transceiver.

10. The electronic device as claimed in claim 8, wherein the communication link is a near field communication link.

11. The electronic device as claimed in claim 8, wherein the electronic device is a mobile phone.

12. The electronic device as claimed in claim 8, wherein the electronic device is a tablet computer.

13. The electronic device as claimed in claim 8, wherein the electronic device is configured to receive notification that a reception of at least one on board application program is possible without causing degradation of operating characteristics for the electronic device.

14. A method of communicating information between two mobile devices, the method comprising:
   identifying, via at least one processor, at least one operating characteristic of a first mobile device; and
   communicating at least one application program from the first mobile device to a second mobile device, if the at least one processor determines that an identified anomalous operating characteristic of the first mobile device would not occur in the second mobile device if the at least one application program is executed on the second mobile device.

15. The method of claim 14, further comprising:
   receiving signals from an integrated sensor coupled to the first mobile device.

16. The method of claim 14, further comprising:
   receiving signals from an integrated sensor coupled to the second mobile device.

17. A non-transitory computer readable medium containing one or more instructions that when executed by one or more processors, cause the one or more processors to:
   identify at least one operating characteristic of a first mobile device; and
   communicate at least one application program from the first mobile device to a second mobile device, if the at least one processor determines that an identified anomalous operating characteristic of the first mobile device would not occur in the second mobile device if the at least one application program is executed on the second mobile device.

* * * * *